(12) United States Patent
Gmelin et al.

(10) Patent No.: US 8,234,914 B2
(45) Date of Patent: Aug. 7, 2012

(54) DEVICE FOR MEASURING FLOWING MEDIA

(75) Inventors: Christoph Gmelin, Stuttgart (DE); Richard Joschko, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 12/308,635

(22) PCT Filed: Apr. 8, 2008

(86) PCT No.: PCT/EP2008/054191
§ 371 (c)(1),
(2), (4) Date: Aug. 13, 2010

(87) PCT Pub. No.: WO2008/128886
PCT Pub. Date: Oct. 30, 2008

(65) Prior Publication Data
US 2010/0294029 A1    Nov. 25, 2010

(30) Foreign Application Priority Data

Apr. 24, 2007    (DE) .......................... 10 2007 019 282

(51) Int. Cl.
*G01F 1/684*    (2006.01)
(52) U.S. Cl. ................. 73/114.34; 73/114.32; 73/202.5; 73/204.21
(58) Field of Classification Search ............... 73/114.32, 73/114.34, 202.5, 204.21, 204.22
See application file for complete search history.

(56) References Cited

U.S. PATENT DOCUMENTS

| | | | |
|---|---|---|---|
| 6,820,479 B2 * | 11/2004 | Roeckel et al. .............. | 73/202.5 |
| 6,826,955 B2 * | 12/2004 | Zurek et al. ................ | 73/204.22 |
| 6,915,682 B2 * | 7/2005 | Renninger et al. ......... | 73/114.34 |
| 6,945,105 B2 * | 9/2005 | Pesahl et al. ............... | 73/204.22 |
| 7,124,626 B2 * | 10/2006 | Lenzing et al. ............. | 73/114.32 |
| 7,162,920 B2 * | 1/2007 | Konzelmann et al. ....... | 73/202.5 |
| 7,305,877 B2 * | 12/2007 | Beyrich et al. .............. | 73/202.5 |
| 7,360,414 B2 * | 4/2008 | Konzelmann et al. ....... | 73/202.5 |
| 7,401,509 B2 * | 7/2008 | Konzelmann et al. ....... | 73/202.5 |
| 7,966,877 B2 * | 6/2011 | Renninger et al. ......... | 73/204.26 |
| 2004/0055375 A1 | 3/2004 | Zurek et al. | |
| 2004/0074291 A1 * | 4/2004 | Lenzing et al. ............. | 73/118.1 |
| 2004/0231405 A1 | 11/2004 | Pesahl et al. | |
| 2006/0150730 A1 * | 7/2006 | Lenzing et al. ............. | 73/202.5 |
| 2007/0062275 A1 * | 3/2007 | Beyrich et al. ............. | 73/204.21 |

FOREIGN PATENT DOCUMENTS

DE        101 35 142        10/2002

(Continued)

*Primary Examiner* — Freddie Kirkland, III
(74) *Attorney, Agent, or Firm* — Kenyon & Kenyon LLP

(57) ABSTRACT

An apparatus for determining at least one parameter of a medium flowing in a main flow direction, in particular of an intake air mass of an internal combustion engine, is proposed. The apparatus has a plug-in part that is introducible into the flowing medium with a predetermined alignment with respect to the main flow direction, having at least one inlet opening and at least one outlet opening as well as at least one main channel connecting the two openings. Also provided is at least one measurement channel that branches off from the main channel, having at least one sensor element, received in the measurement channel, for determining the at least one parameter. At least one directing surface, which diverts the flow of the medium from the measurement channel, is provided before a branching point of the measurement channel from the main channel. The directing surface is disposed at least in part at an angle α different from 90° with respect to a plane that is spanned by the main flow direction and the longitudinal extension axis.

10 Claims, 2 Drawing Sheets

FOREIGN PATENT DOCUMENTS

| | | |
|---|---|---|
| DE | 102 53 970 | 6/2004 |
| JP | 2004-507754 | 3/2004 |
| JP | 2004-117338 | 4/2004 |
| JP | 2004-519690 | 7/2004 |
| JP | 2006-501453 | 1/2006 |
| JP | 2006-506625 | 2/2006 |

* cited by examiner

DEVICE FOR MEASURING FLOWING MEDIA

FIELD OF THE INVENTION

The present invention relates to an apparatus for determining at least one parameter of a medium flowing in a conduit in a main flow direction.

BACKGROUND INFORMATION

Apparatuses for determining at least one parameter of a medium flowing in a conduit in a main flow direction are used, for example, to measure intake air masses of an internal combustion engine. Such apparatuses are used in particular in the form of hot film air mass meters. Other types of apparatus for determining other or further parameters are, however, also conceivable, for example temperature sensors, speed measuring devices, or similar measuring apparatuses, as are measurement principles other than the aforesaid hot film air mass measurement principle.

Hot film air mass meters are discussed, for example, in DE 102 53 970 A1, which refers to an apparatus which has a part that is introducible, with a predetermined alignment with respect to a main flow direction, into a conduit through which the flowing medium is passing.

A partial flow of the medium passes through at least one measurement channel provided in the part, in which channel a measurement element is disposed. Between the inlet and the measurement element, the measurement channel has a curved portion for diverting the partial flow of medium that has entered the measurement channel through the inlet, the curved portion transitioning, as it proceeds, into a portion in which the measurement element is disposed. Provided in the measurement channel is a means that directs the flow and that counteracts flow detachment of the partial medium flow from the channel walls of the measurement channel.

The inlet region is furthermore provided, in the region of the opening that faces away from the main flow direction, with oblique or curved surfaces that are configured in such a way that medium flowing into the inlet region is diverted away from the part of the measurement channel that leads to the measurement element. As a result of this, liquid or solid particles contained in the medium do not, because of their inertia, arrive at the measurement element and cannot contaminate it.

Apparatuses such as, for example, the apparatus in DE 102 53 970 A1 must in practical terms satisfy a number of requirements and boundary conditions. These boundary conditions are largely discussed in the literature, and are discussed, e.g., in DE 102 53 970 A1.

In addition to the objective of decreasing a pressure drop at the apparatuses in global terms by way of a suitable flow-engineering conformation, one of the principal challenges is further to improve the signal quality of such apparatuses. This signal quality refers in particular to the signal swing, which is determined e.g. by a throughput of the medium through the measurement channel leading to the sensor element, and if applicable by a decrease in signal drift and an improvement in signal-to-noise ratio. The configuration, discussed for example in DE 102 53 970 A1, of the inlet opening by way of a surface that deflects liquid and dust particles serves in particular the aforesaid purpose of decreasing signal drift.

At the end of the surface the measurement channel branches off from the main channel, a sharp edge usually being provided here. Water droplets and other contaminants usually cannot follow this detour in the region of the edge, and fly straight through the main channel without arriving at the sensor element. It constantly happens, however, that individual contaminants, in particular water droplets, strike the surface and result in splashes. These lightweight, isolated contamination particles or splashes travel with the measurement air flow into the measurement channel, where they cause signal disruptions. In the case of hot film air mass meters, these signal disruptions are caused in particular by a deposition of liquid films onto the surface of the sensor chip, which modifies the thermal conductivity and heat capacity of the sensor chip, and thus its measurement properties.

SUMMARY OF THE INVENTION

The present invention proceeds from the recognition that the above-described signal-influencing effect resulting from contaminants striking the oblique surface (hereinafter called a "directing surface"), and the fine distribution of such particles resulting therefrom, can be reduced by diverting this spray of finely distributed contaminants, atomized by the directing surface, toward the lateral channel wall. A thin film of water is generally present during operation on the lateral channel wall, which film binds the drops and/or other contaminants and thus keeps them away from the sensor chip.

One possibility for promoting this diversion toward the lateral channel wall involves, according to the present invention, embodying the directing surface obliquely. As a result, droplets and other contaminants that are sprayed off are reflected to the side with high probability by the directing surface, and more droplets and contaminants are picked up by the channel walls. The result of this configuration is that a considerably reduced number of droplets, or indeed no further droplets at all, travel into the measurement channel and thereby influence signal drift.

The present invention thus proceeds from known apparatuses for determining at least one parameter of a medium flowing in a main flow direction, in particular of an intake air mass of an internal combustion engine. The apparatus can in particular encompass a hot film air mass meter in accordance with one of the aforementioned designs. Alternatively or additionally, however, further parameters of the medium can also be measured, for example temperature, pressure, or similar parameters. The flowing medium can be a gaseous medium or also a liquid medium, although other fluid forms, for example aerosols, are also possible.

The apparatus encompasses a plug-in part, having a longitudinal extension axis and introducible into the flowing medium in a predetermined alignment with respect to the main flow direction of the flowing medium. The term "longitudinal extension axis" is to be construed broadly in this context. The plug-in part may be a straight, flat plug-in part, in which context the longitudinal extension axis can extend parallel to the insertion direction into a flow tube. Slight curvatures of the plug-in part are, however, also possible. What is critical is, substantially, the longitudinal extension in the region of an entrance opening to a main channel (see below), so that the term "longitudinal extension axis" can also be understood to mean the local longitudinal extension in that region.

The plug-in part has at least one inlet opening and at least one outlet opening, as well as at least one main channel connecting the inlet opening and outlet opening. Also provided is at least one measurement channel, branching off from the main channel, and having at least one sensor element received in the measurement channel for determination of the at least one parameter. Regarding the configurations of the sensor element and the configurations of the main and measurement channels, reference may be made, for example, to DE 102 53 970 A1 and to the possibilities described therein. Further configurations are also possible, however, in addition thereto.

The apparatus is configured in such a way that at least one directing surface that diverts the flow of medium away from the measurement channel is provided in the flow direction before the branching point of the measurement channel from the main channel. This directing surface can be configured, for example, as in DE 102 53 970 A1. This directing surface can be configured in substantially planar fashion, although slight curvatures (which can be conditioned, in particular, by design engineering) can also be included in particular at the edges of the directing surface. The directing surface may encompass a sharp edge (also called a "tooth") at the branching point of the measurement channel from the main channel, and serves, as described above, substantially to deflect liquid or solid contaminants, for example water, oil, dust, or carbon particles, that are contained in the flowing medium.

The proposed apparatus corresponds to that extent, for example, substantially to the design of DE 102 53 970 A1. In order to implement the above-described idea according to the present invention, however, i.e. the diversion of contaminants rebounding from or sprayed off the directing surface toward the channel wall, the directing surface is disposed at least in part at an angle $\alpha$ different from 90° with respect to a plane that is spanned by the main flow direction and the longitudinal extension axis of the plug-in part.

A fundamental distinction is to be made in this context between angle $\alpha$ between the directing surface and the aforesaid plane, and angle $\beta$ between the sharp edge and the aforesaid plane. However, these angles may be at least substantially identical. The edge may proceed in substantially linear fashion.

Angles that are in the range between 5° and 35° have proven particularly effective. Angle ranges between 10° and 25°, and in particular between 15° and 20°, may be used. These angle ranges are particularly suitable for imparting to the contaminants, in particular water splashes, in the content of usual flow velocities especially in hot film air mass meters, a sufficient velocity component toward the channel walls that they are effectively kept out of the measurement channel.

A further advantage of the oblique "tooth" is that eddies are additionally generated in the region of the branching point by this obliquity. These eddies have the effect that the detachment regions usually formed in the measurement channel after the branching point, which are unstable and which reduce throughput through the measurement channel, are dissipated because the eddies promote mixing of the air flow. The oblique "tooth" thus also causes throughput through the measurement channel to be increased and to be made more uniform. This has a generally positive effect on the signal swing, and fluctuations and noise in the signal are thereby further decreased.

DETAILED DESCRIPTION

Figure 1:
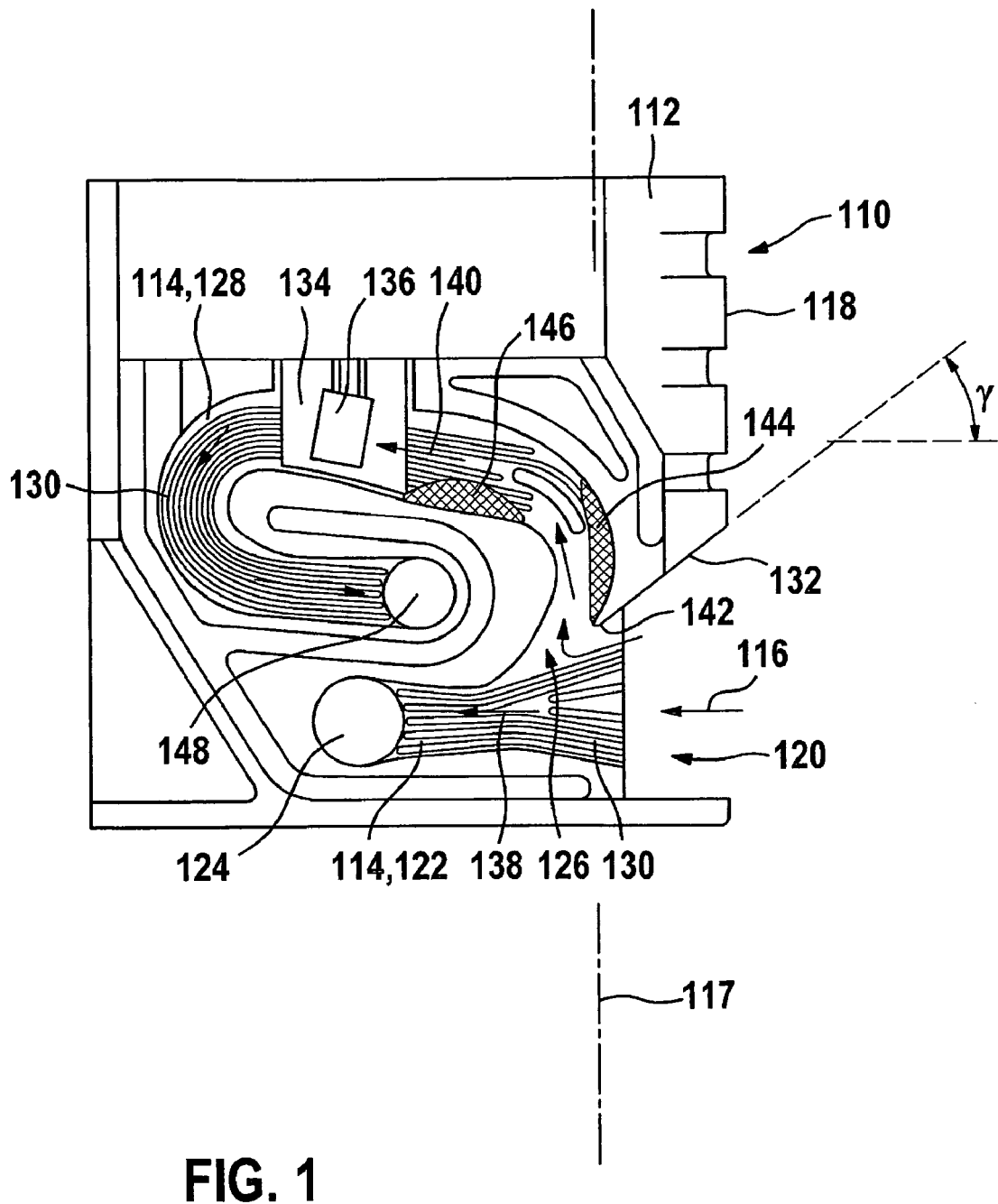
FIG. 1 shows an apparatus, corresponding to the existing art, for measuring at least one parameter.

FIG. 1 depicts in plan view an apparatus 110, corresponding to the existing art, for determining at least one parameter in a flowing medium. An apparatus of this kind is described, for example, in DE 102 53 970 A1. It may also be assumed, without limiting the scope of the present invention, that said apparatus 110 is a hot film air mass meter for determining an air-mass throughput in the intake section of an internal combustion engine.

Apparatus 110 encompasses a plug-in part 112 that is depicted in FIG. 1 in a plan view with an open housing. A cover part (not evident in FIG. 1) was removed for this purpose, enabling a view of flow channels 114 in the plug-in part. Plug-in part 112 is configured in order to be introduced into a medium, for example an air mass being taken in, that is flowing in a main flow direction 116. The air mass can, for example, flow through a flow tube that is not depicted in FIG. 1, and plug-in part 112 can be inserted into said flow tube in order to be aligned with a predetermined orientation with respect to main flow direction 116. In the exemplifying embodiment depicted, plug-in part 112 is straight in its configuration and has longitudinal extension axis 117. Main flow direction 116 and longitudinal extension axis 117 span a plane that, in this depiction in FIG. 1, coincides with the drawing plane.

The plug-in part has a flow incidence side 118, facing away from main flow direction 116, that is of rounded configuration in order to decrease the pressure drop and decrease disturbances in the flow of the medium. Disposed on flow incidence side 118 is an inlet opening 120 after which is adjacent a main channel 122 constituting part of flow channels 114. This main channel 122 proceeds approximately parallel to main flow direction 116 and opens into an outlet opening 124 that, in this exemplifying embodiment, is disposed laterally on plug-in part 112. Be it noted that, in a departure from the profile of flow channels 114 depicted in FIG. 1, other configurations are also possible, for example a placement of outlet opening 124 on the underside of plug-in part 112.

At a branching point 126 located directly after inlet opening 120, a measurement channel 128 that constitutes a further part of flow channels 114 branches off from main channel 122. As symbolized in FIG. 1 by arrows, a partial flow 140 thus branches off from main flow 138 that flows in main channel 122.

In this exemplifying embodiment, flow channels 114 are equipped with flow grooves 130. These flow grooves 130 are interrupted in the region of branching point 126 at the beginning of measurement channel 128, and cause not only an improvement in the flow profile but also a deflection of liquid and/or solid contaminants onto the channel walls of measurement channel 128.

Located directly at inlet opening 120 is a directing surface 132 that diverts incident medium downward away from measurement channel 128. A pulse component perpendicular to main flow direction 116 (downward in FIG. 1) is thereby imparted to the medium that strikes directing surface 132, so that liquid and/or gaseous contaminants that are contained in the medium are diverted away from branching point 126 and, because of their inertia, are conveyed through main channel 122 to outlet opening 124. In this exemplifying embodiment, directing surface 132 forms an angle $\gamma$ of approximately 55° with the main flow direction. Other angles are, however, also usable.

Directing surface 132 at least partly prevents such contaminants from traveling through measurement channel 128 to a sensor carrier 134 projecting into measurement channel 128, and to sensor 136 mounted therein or thereon. This sensor 136, which can be e.g. a hot film air mass meter chip as known from the existing art (e.g. from DE 102 53 970 A1 and the existing art set forth therein regarding this measurement principle), can be controlled and evaluated, for example, via a control and evaluation board above the measurement channel, which board can be connected to sensor carrier 134. This board is not depicted in FIG. 1.

Directly after branching point 126, at a sharp "tooth" 142 at the end of directing surface 132, a first detachment region 144 forms in partial flow 140 because of the considerable diversion of the medium in this region. A further detachment region 146 forms directly after a second diversion of measurement channel 128.

Partial flow 140 flowing through measurement channel 128 from branching point 126 to a measurement channel outlet 148 is intended to represent the entire throughput of flowing medium, and is measured accordingly by way of sensor 136. Detachment regions 144, 146, however, impede partial flow 140 and thus impede throughput throw measurement channel 128. As described above, the signal swing is thereby reduced. In addition, detachment regions 144, 146 are unstable in terms of size, which leads to fluctuations in throughput through measurement channel 128 and thus to signal fluctuations.

Figure 2:
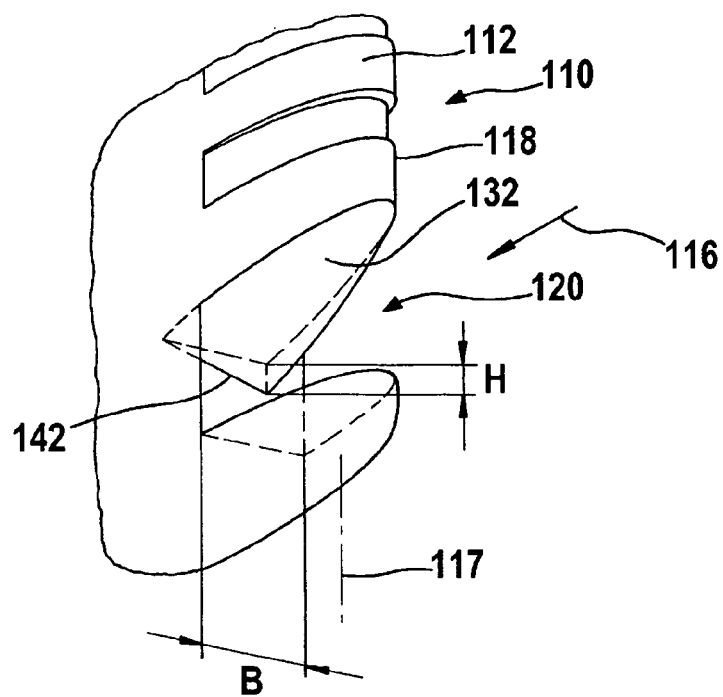
FIG. 2 shows a perspective depiction of a modification according to the present invention of the apparatus shown in FIG. 1.
Figure 3:
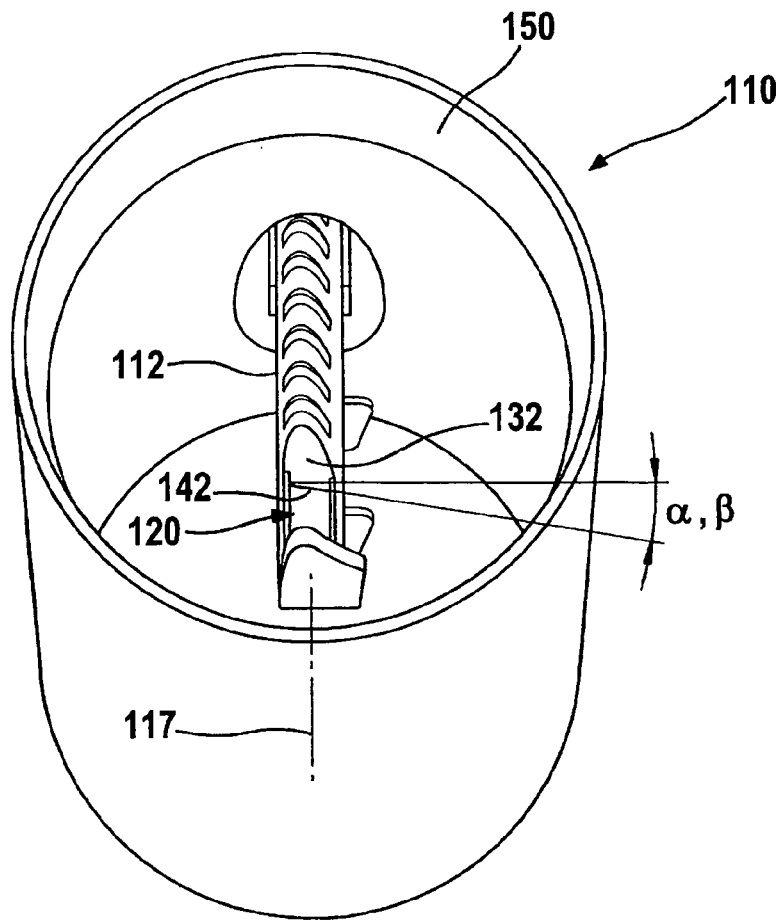
FIG. 3 shows a perspective depiction of an apparatus according to the present invention having a plug-in sensor inserted into the flow tube.

FIGS. 2 and 3 show a modification according to the present invention of apparatus 110. FIG. 2 is a partial perspective depiction of the region of inlet opening 120, viewed obliquely from below. FIG. 3 is a view into a flow tube 150 in a viewing direction parallel to the drawing plane in FIG. 1, i.e. in a plane that is spanned by main flow direction 116 and longitudinal extension axis 117 of plug-in part 112. The direction of view in FIG. 3 is once again slightly obliquely from below toward plug-in part 112, i.e. at an angle of approx. 20° to main flow direction 116. The two depictions will be explained together below.

As is evident in particular from what is depicted in FIG. 3, in this exemplifying embodiment directing surface 132 proceeds in substantially planar fashion and ends at the straight sharp edge 142. According to the present invention, sharp edge 142, and thus also "tooth" 142, do not proceed perpendicular to the plane spanned by longitudinal extension axis 117 and main flow direction 116, but instead form with said plane the angles $\alpha$ and $\beta$, respectively. In this exemplifying embodiment, $\alpha$ and $\beta$ are identical and are equal to approx. 15°.

As is evident from FIG. 2, inlet opening 120 of plug-in part 112 has a width B. This width falls, for example, in the range of approx. 5 mm. A height difference H is accordingly created between the left (looking in the direction of main flow direction 116) side of edge 142 and the right side of edge 142. Angles $\alpha$ and $\beta$ are determined by calculation as follows:

$$\tan\alpha bzw \cdot \tan\beta = \frac{H}{B}$$

Height differences in the range of 1 to 2 mm are typically used in this context; these have proven well-suited for producing the above-described effect of redirecting water droplets or other contaminants from directing surface 132 onto one of the walls of flow channels 114.

What is claimed is:

1. An apparatus for determining at least one parameter of a medium flowing in a main flow direction, in an intake air mass of an internal combustion engine, comprising:
   a plug-in part that has a longitudinal extension axis and is introducible into the flowing medium with a predetermined alignment with respect to the main flow direction, the plug-in part including:
     at least one inlet opening;
     at least one outlet opening, wherein at least one main channel connects the inlet opening and the outlet opening, wherein at least one measurement channel branches off from the main channel;
     at least one sensor element, which is in the measurement channel, for determining the at least one parameter;
   wherein at least one directing surface, which diverts the flow of the medium from the measurement channel, is provided before a branching point of the measurement channel from the main channel, and
   wherein the at least one directing surface is disposed at least in part at an angle $\alpha$ different from 90° with respect to a plane that is spanned by the main flow direction and the longitudinal extension axis.

2. The apparatus of claim 1, wherein the directing surface ends at the branching point in a sharp edge, which is disposed at least in part at an angle $\beta$ different from 90° with respect to the plane spanned by the main flow direction and the longitudinal extension axis.

3. The apparatus of claim 1, wherein the edge proceeds in a substantially linear fashion.

4. The apparatus of claim 1, wherein the directing surface is substantially a planar directing surface.

5. The apparatus of claim 1, wherein the angle $\alpha$ is substantially identical to the angle $\beta$.

6. The apparatus of claim 1, wherein the angle $\alpha$ is in the range between 5° and 35°.

7. The apparatus of claim 1, wherein the inlet opening has, perpendicular to the plane spanned by the main flow direction and the longitudinal extension axis, a width between 3 mm and 10 mm.

8. The apparatus of claim 1, wherein the inlet opening has, perpendicular to the plane spanned by the main flow direction and the longitudinal extension axis, a width of about 5 mm.

9. The apparatus of claim 1, wherein the angle $\alpha$ is in the range between 10° and 25°.

10. The apparatus of claim 1, wherein the angle $\alpha$ is in the range between 15° and 20°.

* * * * *